Patented Sept. 26, 1922.

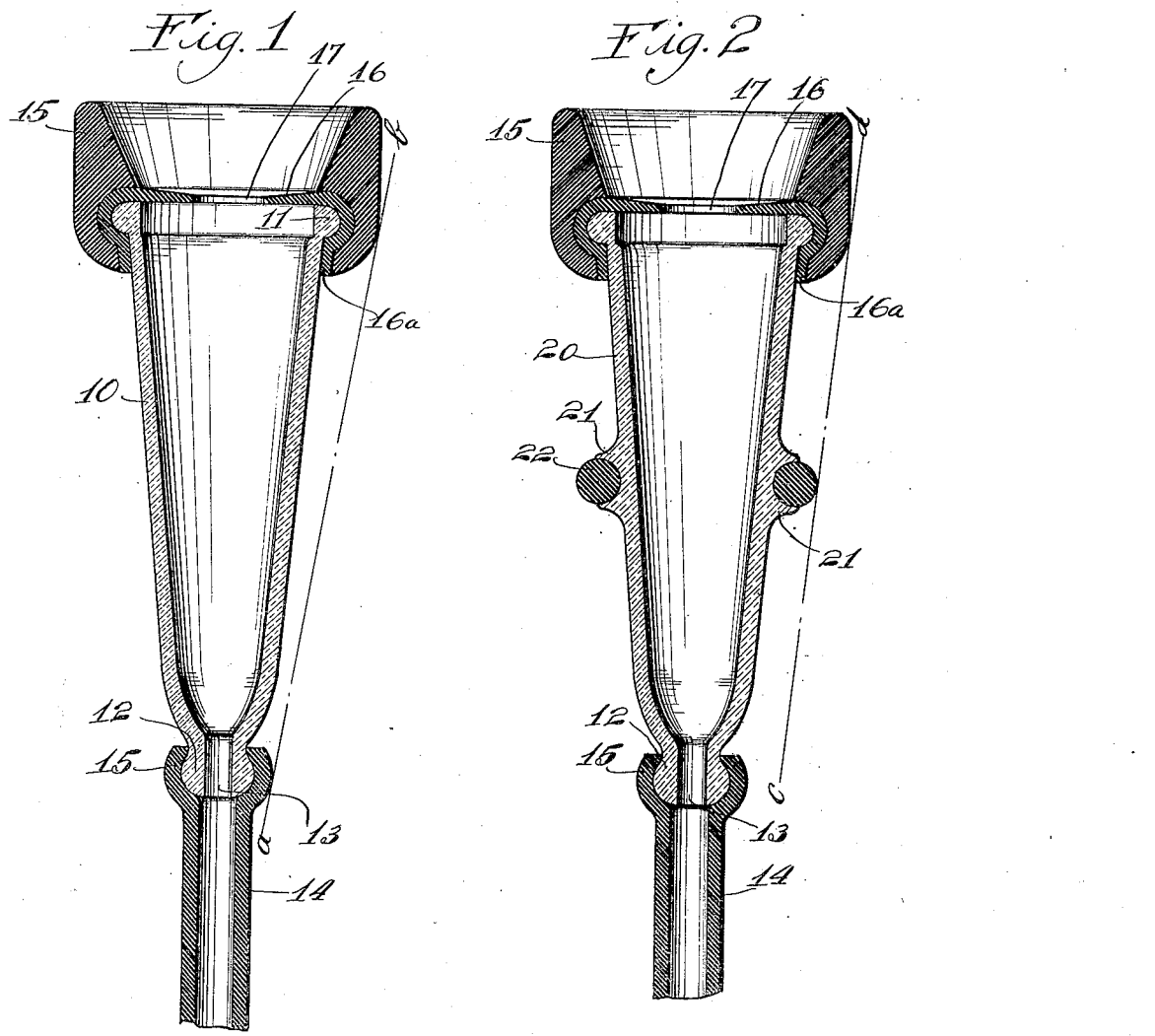

1,430,191

UNITED STATES PATENT OFFICE.

NEALON D. RUTHERFORD, OF LANSING, MICHIGAN, ASSIGNOR TO UNITED ENGINE COMPANY, A CORPORATION OF MICHIGAN.

TEAT CUP FOR MILKING MACHINES.

Application filed April 26, 1920. Serial No. 376,528.

*To all whom it may concern:*

Be it known that I, NEALON D. RUTHERFORD, a citizen of the United States, residing at Lansing, in the county of Ingham and State of Michigan, have invented certain new and useful Improvements in Teat Cups for Milking Machines, of which the following is a specification.

The invention relates to improvements in a device or cup adapted for engaging cow's teats and being particularly adaptable for use with milking machines of the intermittent suction type.

It is the primary object of the invention to provide an improved teat cup in which the chief body portion or bowl thereof shall be of transparent material as glass, thereby rendering the action of the device on the cow's teats and the flow of the milk therefrom visible to the operator or attendant, and in which the parts engaging the cow's teats directly shall be formed of rubber or analogous flexible and resilient material so arranged in conjunction with the connections leading to the cup actuating mechanism and the milk reservoir that every part of the transparent or breakable bowl or body portion shall be protected against contact and possible breakage when the teat cup is accidentally or otherwise dropped upon a hard plane surface as the wood or concrete floor of a dairy barn.

It is a further object of the invention to provide in a teat cup of the described character having a body or bowl portion of frangible material of improved means formed integral with the frangible body or bowl portion intermediate its extremities adapted to receive and retain elastic or resilient cushioning means to protect said body or bowl portion against breakage.

It is a further object of the invention to provide in a teat cup an improved construction of the flexible teat engaging means whereby certain advantages and economies are secured as hereinafter set forth.

Other objects of the invention will appear from the following description of the invention as shown also in the drawing, the novel features being defined in the claims.

In the said drawing Fig. 1 is a longitudinal section through the teat cup in its preferred form.

Fig. 2 is a view similar to Fig. 1 showing a modified form of the frangible body portion or bowl with an intermediate protective element applied thereto.

The body portion or bowl of the cup formed of glass is given the shape of a frustum of a cone to conform in a measure to the shape of the cow's teat, and such body part is indicated in Fig. 1 by reference character 10. The end having the larger diameter is open and is preferably provided around its outside peripheral edge with a bead or rib indicated by reference character 11 and the body portion 10 tapers preferably in a uniform manner, as illustrated, to a point adjacent the smaller end, where it is contracted at a greater angle until it reaches a diameter approximating a little less than half the diameter at the point where this more abrupt taper begins. Thence the material at the smaller end is provided with a nib or enlargement which I have indicated by reference character 12, the latter being perforated, as indicated by reference character 13, to furnish an outlet to the interior of the body portion or bowl of the cup. The enlargement or nib 12 is circumferential in form like the bead 11 at the larger end thereof, and is adapted to receive and retain the expanded end of the rubber or other flexible tube 14, which leads to the suction producing apparatus and the milk reservoir through suitable valve mechanism as well known in this art. Where the flexible tube is expanded in forming contact with the enlargement 12 of the cup bowl the same is indicated by reference character 15 and the usual elasticity of rubber or composition tubing of a flexible character used in this relation will be sufficient to retain the same to form an air tight union with the cup.

Heretofore it has been proposed to use rubber or analogous flexible material in contact with the enlarged and teat engaging end of teat cups of this character, and it has also been common to form such rubber or other flexible material so that it will present a thin body portion in contact with the exterior of the cow's teat in order to secure the desired flexibility and cushioning effect between the cup and the teat and at the same time an air tight connection. It has however, been the common practice to form the teat engaging part of one integral piece of material, as vulcanized rubber or a vulcanized compound of which caoutchouc or india rubber forms the principal ingredient.

I prefer however, to form an enlarged cup adapted to engage the udder of the cow, as indicated by reference character 15. This, I preferably form of vulcanized rubber, which in order to give this part the desired firmness and durability, I prefer to have of a comparatively firm quality of material when vulcanized of somewhere near the consistency as to firmness and flexibility of vulcanized rubber ordinarily used in the manufacture of such articles as rubber boots and shoes, and in some instances the cup part 15 might even be of rubber of a firmer character. The part 15 will be formed with a central opening adapted to contact with the teat of the cow adjacent the udder and the body walls of the cup 15 will be thickened downward gradually so that the interior opening will be contracted from the top of the cup, or the end designed to contact with the cow's udder, toward the top of the glass body portion or bowl so that the diameter of this opening where it is designed to lie adjacent the top of the bowl will preferably be about equal to the interior diameter of the glass body portion or bowl 10 at its larger or upper end, as illustrated in Fig. 1. After the peripheral walls of the cup part 15 are thickened and extended downwardly about one half the normal height of the cup I prefer to form therein an abrupt enlargement not only designed to encircle, when in position upon the body portion or bowl 10, the peripheral bead 11, but also being enlarged sufficiently to fit smoothly around bead 11 without too much stretching of the walls of the cup I provide a teat diaphragm, which I designate generally by reference character 16 which is interposed between cup 15 and bowl 10. As stated, it has been the common practice heretofore to form some sort of diaphragm or teat engaging membrane, as the diaphragm 16, by making it integral with the rubber cup part 15, the flexibility necessary to make same operative being secured by making the diaphragm part quite thin, for it will be obvious that although such diaphragm is perforated, as indicated at 17, there will be some variation in the size of cow's teats on which the cup will be used, and even variations between different teats on the same cow, so that in order to secure an air tight union when the cup is in position on the cow's teat, it will be desirable to construct the diaphragm 16 with the perforation 17 therein somewhat smaller than the normal diameter of the teat of the cow, so that the diaphragm will be necessarily expanded upon the application of the cup thereto. The plan heretofore followed of constructing the diaphragm part 16 integral with the body part 15 has resulted in the necessity of making use of a composition quite rich in rubber in order to secure the necessary flexibility in the diaphragm with the result that it has made the construction of the entire cup more expensive than would be otherwise necessary, because the cup 15 itself may be vulcanized from compounds economical to produce and the firmness resulting therefrom will be more desirable than where a purer gum is used in producing the cup. The body of the diaphragm part 16 I preferably form of relatively thin material tapering the thickness thereof downwardly toward the perforation 17 therethrough, thereby giving a dish-like formation to the central part of the diaphragm, which enables me to apply the device to teats of varying sizes of a cow more readily, as the portion of the diaphragm adjacent the perforation being tapered will yield more readily to expansion, and I further form my diaphragm with a peripheral flange extending approximately at right angles to the main circular body of the diaphragm and this flanged portion, which I indicate by reference character 16ª, will be sufficiently extended so that when the diaphragm 16 is in position on the larger end of the glass body portion or bowl 10 it will envelope or surround the bead 11, thus retaining itself in position thereon, while the skirt of this flanged part will contact closely with the wall of the body part 10 below the bead forming an air tight union. I find that by forming the lower extremity of the skirt portion 16ª of the flanged part of the diaphragm 16 of considerable less interior diameter than the exterior diameter of the body portion or bowl below the bead I am assisted in a marked degree in maintaining the air tight union between the glass body portion or bowl and these rubber parts for engaging the udder and teat of the cow. In applying the cup 15 and the diaphragm 16 to the glass bowl or body portion 10 the operator may first put the flexible diaphragm portion 16 in position over the bead 11, after which the cup part of the firmer rubber may be stretched over the diaphragm upon the upper end of the glass body part or bowl. However, in practice, it is found that the application of rubber to rubber on account of the resulting friction is not an easy matter, and I prefer to first assemble the rubber diaphragm and the rubber cup portion 15, and then by moistening or wetting the end of the glass body portion or bowl 10 adjacent the bead 11, it will be found that the same may be slipped into the position of the parts indicated in Fig. 1 more readily as the rubber parts 15 and 16 will stretch sufficiently to accommodate the introduction of the bead 11 and will afterwards close by reason of the inherent elasticity, forming the union indicated in the drawing, which is sufficiently permanent that the parts will remain together throughout the operative life of the rubber diaphragm and cup unless it is desired by the operator to disassemble the parts.

It has heretofore been proposed to use body portions or bowls of glass in teat cups, but in the construction employed the body portion has been so constructed that whenever the teat cup should fall with more or less violent contact on a surface such as a concrete floor, as commonly found in dairy barns, the result would be to fracture or break the frangible cup or body portion. In the present construction, it will be seen with reference to Fig. 1 that I have constructed the rubber cup part 15 with the thickened lower walls and have provided the nib or enlargement 12 at the lower end so that when it takes the end of the rubber tubing 14 the enlarged portion 15 of the tubing together with the lower end of the cup 15 will lie in a common plane $a, b$, that is entirely outside of the glass body portion or bowl from which it follows that if one of my improved teat cups should fall upon a flat surface such as a concrete floor nothing but the rubber thereon will touch the floor and breakage will be avoided.

In the modified form shown in Fig. 2 the bowl or body portion similar in construction to that shown in Fig. 1 and designated by reference character 20 is provided with a central peripheral enlargement indicated by reference character 21, the same being preferably grooved and designed to take a rubber circumferential band or ring 22. The outer peripheries of the rubber band 22, it will be seen, will lie in a plane which will intersect the outer peripheral edge of the rubber cup portion 15 in such a manner that said plane, which is indicated by reference characters $c, d$, will lie entirely outside the glass body portion or bowl so that whenever the cup be dropped even with considerable force upon a hard flat surface, the glass body portion or bowl will be protected against contact or breakage. The protective encircling rubber band or ring 22 being removable may be readily replaced in case of wear or damage at a slight cost, and the same is true to a marked degree with respect to the detachable diaphragm 16, which latter will require replacement or renewal in actual use more often than would the more firm and less easily injured or deteriorated cup body part 15. It is well known that the life of vulcanized rubber does not ordinarily exceed more than a few years and sometimes lasts only a few months, while with the large firm body such as the cup 15 where little flexibility is required, replacement will not so often be necessary, hence the economy of my improved construction.

I claim:

1. In a teat cup, the combination with a frangible body or bowl portion of substantially conical form, being provided with a circumferential bead at its larger end, a flexible teat engaging device held in position on the said frangible body portion or bowl by the said bead, the smaller end of the frangible body portion or bowl being provided with a perforated nipple adapted to form a union with the flexible connection, there being a grooved peripheral enlargement formed integrally on the exterior of said body portion or bowl intermediate the extremities thereof, and a circumferential member of flexible material in the said groove, the exterior peripheries of said circumferential flexible member and said teat engaging device lying in common planes, each wholly without the said frangible body portion or bowl of the teat cup, whereby to protect the said frangible body portion or bowl against contact should the cup forcibly contact with a plane hard surface.

2. In a teat cup, the combination with a bowl being provided with a circumferential bead at one of its ends, a flexible teat engaging device held in position on the said bowl by the said bead, a diaphragm having a perforation at the approximate center thereof and a depending flange adapted to pass over said bead and embrace the outer walls of said bowl intermediate the inner wall of said teat engaging device and said bowl.

3. In a teat cup, the combination with a substantially conically shaped bowl having a circumferential bead at its larger end with a flexible teat engaging device adapted to engage said bead and a portion of the outer wall of said bowl, a diaphragm having a perforation at its approximate center and of dish-like formation, said diaphragm being provided with a skirt-like portion adapted to lie over said bead and embrace the upper portion of the said bowl intermediate the said bowl and the said teat engaging device.

In testimony whereof I have signed my name to this specification.

NEALON D. RUTHERFORD.